United States Patent [19]

Emert et al.

[11] 4,239,131
[45] Dec. 16, 1980

[54] SELF-PRIMING LIQUID DISPENSER

[76] Inventors: Ken Emert, 17215 SW. 85th Ave., Miami, Fla. 33157; Dan Rogers, 2910 SW. 120th Rd., Miami, Fla. 33155

[21] Appl. No.: 855,198

[22] Filed: Nov. 28, 1977

[51] Int. Cl.³ .............................................. G01F 11/02
[52] U.S. Cl. .................... 222/135; 222/377; 222/378; 222/380
[58] Field of Search ............... 222/377, 380, 495, 496, 222/497, 378, 135

[56] References Cited
U.S. PATENT DOCUMENTS

| | | | |
|---|---|---|---|
| 2,104,990 | 1/1938 | Hoefler | 222/377 UX |
| 2,197,270 | 4/1940 | Helland | 222/380 X |
| 2,464,030 | 3/1949 | Engstrom | 222/380 X |
| 3,078,016 | 2/1963 | Judy | 222/496 X |
| 3,543,682 | 12/1970 | Farrow | 222/380 X |

Primary Examiner—Robert J. Spar
Assistant Examiner—Frederick R. Handren
Attorney, Agent, or Firm—Eugene F. Malin; Barry L. Haley; Philip R. Wadsworth

[57] ABSTRACT

A container having an opening in its top by which it may be filled with liquid and an opening in its bottom through which liquid may be expelled. The bottom opening is covered by the distal end part of a first rod which is surrounded by a gasket; the first rod is connected to a first piston within a first cylinder. The first cylinder forms a second rod which is connected to a second piston within a second cylinder. The rods and pistons are so arranged that a downward force on the second rod causes the first rod to rise allowing liquid to be dispensed from the bottom opening.

4 Claims, 5 Drawing Figures

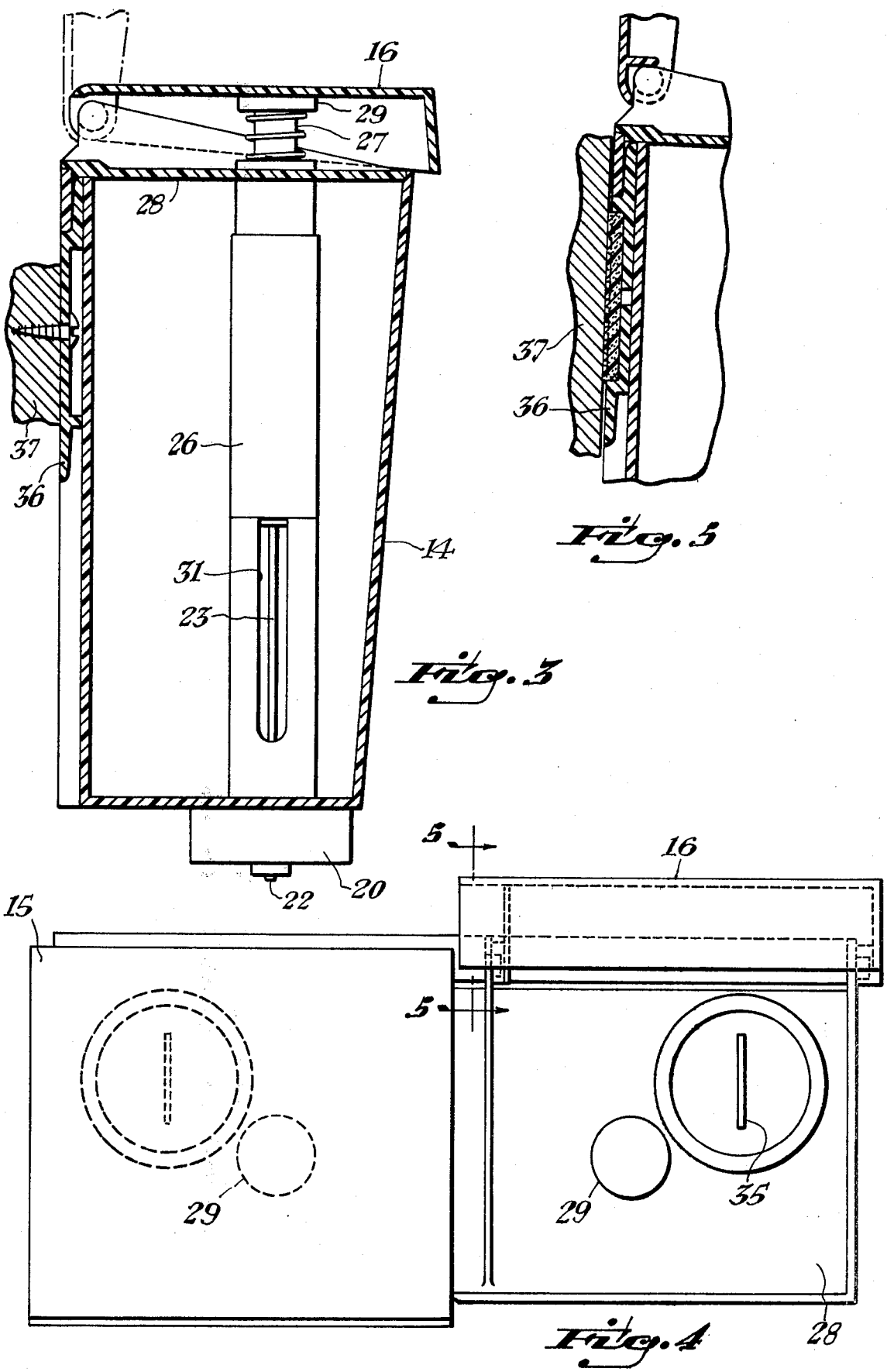

SELF-PRIMING LIQUID DISPENSER

BACKGROUND OF THE INVENTION

This device relates to the field of liquid dispensers and more particularly to containers with dispensing means thereon, said means being capable of dispensing a set maximum amount of liquid.

BRIEF SUMMARY OF THE INVENTION

A device comprising a container or series of connected containers wherein each container has an inflow opening through which it may be filled and an outlet through which liquid may be dispensed. The outlet is blocked by the end of a narrow rod which is surrounded by a gasket. A flat circular disc with the rod at its center is attached to and extends perpendicularly and outwardly from the rod at about ½ inch from the end of the rod. The disc acts as a piston and is surrounded along its external circumference by an elongated cylinder which extends upwardly through the length of the container protruding through the container's top. The lower end of the cylinder has a flat circular washer shaped plate extending perpendicularly and outwardly from it. The plate acts as a piston within a cylindrically shaped protuberance extending from the bottom of the container. Thus the elongated cylinder extending through the top of the container acts as a rod for the washer shaped piston connected to it.

The device operates as follows. The portion of the elongated cylinder protruding from the container is depressed. This forces the washer shaped piston into the cylindrically shaped protuberance extending from the bottom of the container. Pressure is thus created within the cylindrical protuberance which forces the liquid therein against the disc shaped piston which is connected to the rod which blocks the container's outlet. While the pressure is applied the rod is caused to rise thus allowing liquid in the container to flow out.

In accordance with the above described construction and operation it is the primary object of this invention to present a device for dispensing liquid.

Another object is to present such a device which will only dispense a predetermined maximum amount upon each actuation of the dispenser.

Yet another object is to present such a device which can be easily attached to a bathroom wall for use as a shampoo and conditioner dispenser.

Still another object is to present such a device which can be easily and inexpensively manufactured from an easily formable plastic material.

These together with other objects and advantages will become apparent to those skilled in the art upon reading the details of construction and operation as more fully setforth hereinafter, reference being had to the accompanying drawings forming a part hereof, wherein like numerals refer to like parts throughout.

BRIEF DESCRIPTION OF THE DRAWINGS

FIG. 3 illustrates a cross sectional side view of the device shown in FIG. 1.

FIG. 4 is an illustration of a plane top view of the device shown in FIG. 1.

FIG. 5 illustrates a cross sectional side view of the upper rear portion of the device while attached to a wall.

DESCRIPTION OF A PREFERRED EMBODIMENT

Before the present liquid dispenser is specifically described, it is to be understood that the invention is not limited to the particular arrangement of the parts here shown, as such devices may vary. It is also to be understood that the phraseology or terminology herein used is for purposes of description of particular embodiments and not of limitation, as the scope of the present invention is denoted by the appended claims.

Figure 1:
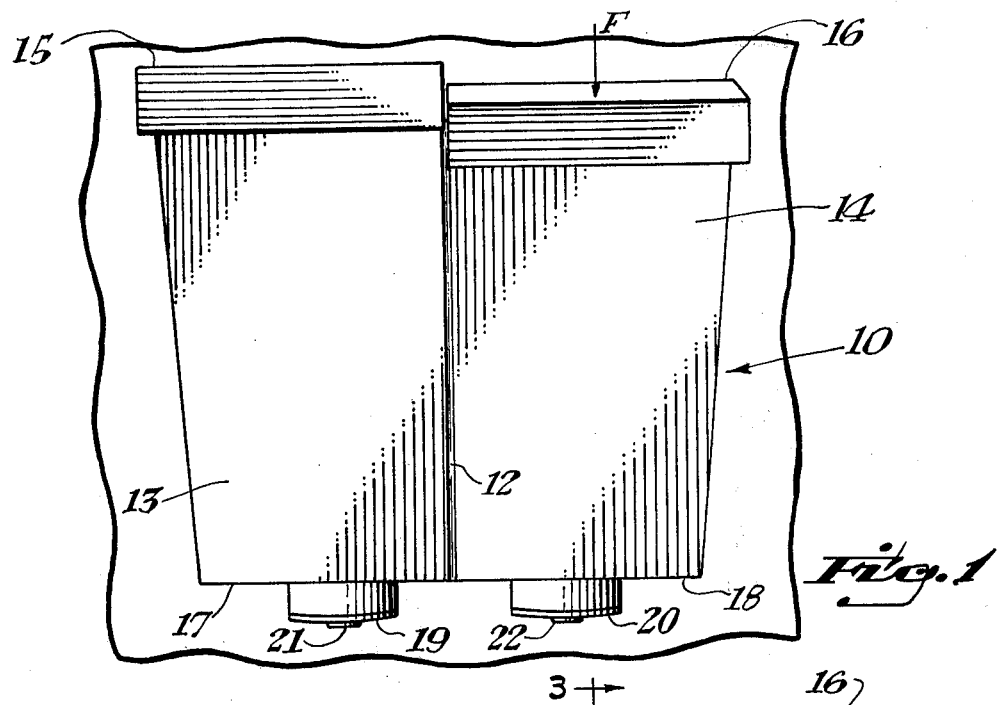
FIG. 1 is an illustration of a plane front view of the device.

FIG. 1 is a front plane view of the device showing two containers generally referred to by the numerals 10 and 11. The containers share a common side panel at 12 and have front panels 13 and 14 and side and back panels 34 not shown. Each container has a hinged lid 15 and 16 which can be pressed downward when force F is applied. The bottom panel 17 and 18 of each container has a cylindrical protuberance 19 and 20 which extends perpendicularly downwardly perpendicular from the containers. There is an opening 21 and 22 in the center of each protuberance.

Figure 2:
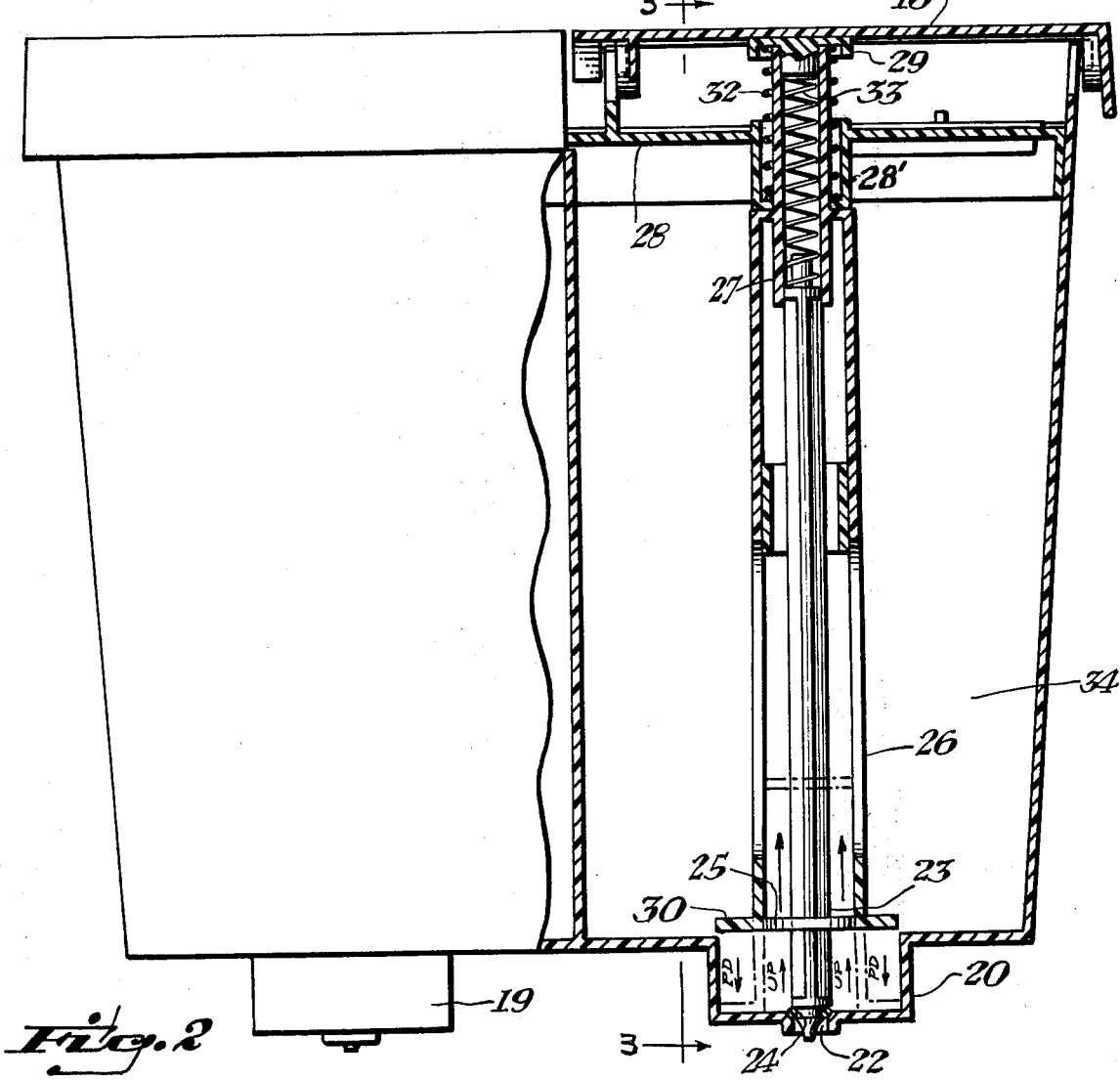
FIG. 2 is an enlargement of FIG. 1 showing cross sectional view of one of the containers.

Referring now to FIG. 2, the device of FIG. 1 is shown with the front panel of container 10 partially broken away showing some of the parts in a cross-section. The outlet 22 is blocked by end of rod 23 which has a gasket seal 24 around the rod 23. A flat circular disc 25 is connected to rod 23 at a point about ½ inch from the distal end of rod 23. Disc 25 acts as a piston and is surrounded along its external circumference by cylinder 26. Cylinder 26 and rod 23 are relatively movable to one another. Rod 23 extends upward and is slidably received in a smaller cylinder 27. Cylinder 27 extends through the container's lid 28 and has a flattened end 29 which lies against the bottom of movable cover 16. The bottom of cylinder 26 has a flat circular washer shaped plate 30 extending perpendicularly from it. The plate 30 acts as a piston within cylinder 20. In the unperturbated position the perimeter of plate 30 is elevated slightly above the top edge of cylinder 20. The cylinder 26 acts as a connecting rod for the washer shaped piston 30. The cylinder 26 has an elongated slot 31 on each side as shown in FIG. 3 that is open to the interior of container 34. The cylinder member 27 has a coiled spring 32 around its outer circumference which holds the end 29 of cylinder 27 against the cover 16. The other end of spring 32 contacts the inturned lip portion of member 28'. By holding cylinder 27 up, spring 32 holds cylinder 26 up in the position shown in FIG. 2, thus holding piston plate 30 out of cylinder 20. Cylinder member 27 has a coiled spring 33 in it which presses downward on rod 23 thus holding the seal 24 on the end of rod 23 against the edges of opening 22 thus keeping the liquid 34 in the container 10 from flowing out.

Liquid may be added to the container by swinging back the hinged cover 16 and removing the cap 35 as shown in FIG. 4. The device may be placed on a wall 37 be attaching a plate 36 to the wall by a screw 38 as shown in FIG. 3 or by an adhesive such as epoxy as shown in FIG. 5.

The device operates as follows. A downward force F is applied to the cover 16. The cover forces the end 29 of cylinder 27 downward, which forces cylinder 26 downward which forces piston plate 30 down into cylinder 20 as shown by arrows PD. The liquid forced from cylinder 20 applies an upward pressure on the disc 25 as shown by arrows UP. The liquid's upward pressure on disc 25 forces the disc 25 and rod 23 attached to it upward thus unblocking the outlet 22 and allowing liquid 34 to flow out. If the same amount of force F is applied to cover 16 each time, the device will dispense the same amount of liquid each time and regardless of how quickly the lid 16 is depressed, only a predetermined maximum amount of liquid may be dispensed per depression.

It should be noted that one container may be used by itself or in connection with one another as shown or with any number of other containers.

The instant invention has been shown and described herein in what is considered to be the most practical and preferred embodiment. It is recognized, however, that departures may be made therefrom within the scope of the invention and that obvious modification will occur to a person skilled in the art.

What I claim is :

1. A liquid dispenser, comprising:
    a container having a first opening in it through which liquid may be added to said container, a second opening in it through which liquid may be dispensed from said container, and a third opening in the top of said container,
    a rod shaped member disposed within said container having a distal end capable of blocking said second opening,
    a circularly disc shaped member connected to and extending perpendicularly from said rod near said distal end,
    a first hollow cylindrically shaped member which extends the length of said container, the internal circumference of said first cylindrically shaped member being nearly equal to the circumference of said disc, said circularly disc shaped member slidable within said first hollow cylindrically shaped member,
    a hollow cylindrically shaped extension connected to said first cylindrically shaped member, said extension movably protruding out said third opening of said container, the proximal end of said rod shaped member slidable within said hollow extension,
    a flat circularly shaped plate extending perpendicularly and outwardly from the distal end of said first cylindrically shaped member,
    a second cylindrically shaped member surrounding said second opening, said second member having an internal circumference equal to the external circumference of said plate, said distal end of said first cylindrically shaped member slidable within said second cylindrically shaped member.

2. A dispenser, as disclosed in claim 1, wherein:
    the components are composed of plastic.

3. A dispenser, as disclosed in claim 2, wherein:
    said distal end of said rod shaped member is biased against said second opening by a first coil spring, and
    said extension connected to said first cylindrically shaped member is biased to protrude outside the container by a second coil spring.

4. A dispenser, as in claim 3, which is connected to another such dispenser.

* * * * *